United States Patent
Bresciani et al.

(10) Patent No.: US 11,906,308 B2
(45) Date of Patent: Feb. 20, 2024

(54) OPTICAL UNIT FOR A PROJECTIVE OPTICAL METROLOGICAL SYSTEM FOR DETERMINING QUANTITIES RELATIVE TO THE ASSET AND/OR POSITION AND COMMUNICATING DATA

(71) Applicants: Thales Alenia Space Italia S.p.A. Con Unico Socio, Rome (IT); Scuola Superiore Di Studi Universitari E Perfezionamento Sant' Anna, Pisa (IT)

(72) Inventors: Fulvio Bresciani, Turin (IT); Valter Basso, Turin (IT); Ernesto Ciaramella, Pisa (IT); Giulio Cossu, Pisa (IT); Mario Rannello, Pisa (IT)

(73) Assignees: Thales Alenia Space Italia S.p.A. Con Unico Socio, Rome (IT); Scuola Superiore Di Studi Universitari E Perfezionamento Sant'Anna, Pisa (IT)

( * ) Notice: Subject to any disclaimer, the term of this patent is extended or adjusted under 35 U.S.C. 154(b) by 0 days.

(21) Appl. No.: 18/016,641

(22) PCT Filed: Jul. 15, 2021

(86) PCT No.: PCT/IB2021/056411
§ 371 (c)(1),
(2) Date: Jan. 17, 2023

(87) PCT Pub. No.: WO2022/013816
PCT Pub. Date: Jan. 20, 2022

(65) Prior Publication Data
US 2023/0288206 A1 Sep. 14, 2023

(30) Foreign Application Priority Data
Jul. 17, 2020 (IT) .................. 102020000017488

(51) Int. Cl.
G01C 21/16 (2006.01)
G01C 21/02 (2006.01)
H04B 7/185 (2006.01)

(52) U.S. Cl.
CPC ....... G01C 21/025 (2013.01); G01C 21/1656 (2020.08); H04B 7/18519 (2013.01)

(58) Field of Classification Search
CPC .............. G01C 21/025; G01C 21/1656; H04B 7/18519; H04B 10/118; G01S 5/16; G01S 5/163
See application file for complete search history.

(56) References Cited

U.S. PATENT DOCUMENTS

2007/0031151 A1 2/2007 Cunningham et al.
2022/0029287 A1* 1/2022 Shi .................. H01Q 21/24
(Continued)

FOREIGN PATENT DOCUMENTS

EP 2508428 A1 10/2012

OTHER PUBLICATIONS

Geng Zhe et al., Fusion of Radar Sensing and Wireless Communication Signals into the Radar Transmit Waveform, IET Radar Sonar Navigation, The Institution of Engineering and Technology, UK, Vo.. 12, No. 6, 2018, pp. 632-640.
(Continued)

*Primary Examiner* — Tony Ko
(74) *Attorney, Agent, or Firm* — McCarter & English, LLP (57) ABSTRACT

Optical unit for a projective optical metrological system, which receives a light signal coming from a light constellation comprising a number of light sources; the optical unit includes: an optoelectronic image acquisition system and a
(Continued)

first and a second optical circuit, which receive the light signal and are traversed by a first and a second optical beam, respectively. The first and the second optical circuits direct, respectively, at least a first part of the first optical beam and at least a first part of the second optical beam on the optoelectronic image acquisition system, so as to cause the simultaneous formation of two different images of the constellation in the optoelectronic image acquisition system. The optical unit further includes an electronic processing unit coupled to the optoelectronic image acquisition system, which determines a number of quantities indicative of the position and/or attitude of the light constellation with respect to the optical unit, based on the two images. The optical unit further includes an optical receiver and a derivation optical circuit configured to optically couple the optical receiver and at least one of the first and the second optical circuit, so that the optical receiver receives an optical information signal, which is a function of at least one of the first and the second optical beams. The optical receiver demodulates digital data from the optical information signal.

14 Claims, 5 Drawing Sheets

(56) References Cited

U.S. PATENT DOCUMENTS

2022/0342043 A1\* 10/2022 Wagner ................. G01S 7/4813
2022/0398759 A1\* 12/2022 Schindler ............. G06V 20/647
2023/0288206 A1\* 9/2023 Bresciani ........... H04B 7/18519
250/203.6

OTHER PUBLICATIONS

PCT International Search Report and Written Opinion dated Nov. 25, 2021 for PCT Application No. PCT/IB2021/056411.

\* cited by examiner

OPTICAL UNIT FOR A PROJECTIVE OPTICAL METROLOGICAL SYSTEM FOR DETERMINING QUANTITIES RELATIVE TO THE ASSET AND/OR POSITION AND COMMUNICATING DATA

CROSS-REFERENCE TO RELATED APPLICATIONS

This patent application is a 35 U.S.C. § 371 National Stage filing of International Application No. PCT/M2021/056411, filed on Jul. 15, 2021, which application claims priority from Italian patent application no. 102020000017488 filed on Jul. 17, 2020, the entire disclosure of which is incorporated herein by reference.

TECHNICAL SECTOR OF THE INVENTION

The present invention relates to an optical unit for a projective optical metrological system for determining quantities relative to the asset (attitude) and/or position and for communicating data.

The present invention finds advantageous, though not exclusive, application in the aerospace sector, in particular in the determination of the reciprocal position and asset (attitude) of a pair of satellites, in the communication of data between the pair of satellites and, in general, in the exchange of digital signals between the two satellites.

BACKGROUND OF THE INVENTION

As is well known, metrological systems are used in the aerospace industry to determine the asset (attitude) and/or the position of a satellite. Even more specifically, metrological systems are known that allow, given a pair of satellites, the reciprocal position and the attitude between the two satellites to be determined.

The determination of the attitudes and of the positions of the satellites is of particular importance in the case of satellite systems whose satellites are being formed, i.e. in cases where it is necessary to determine the attitude and the position of each satellite as a function of the attitude and of the position of the other satellites.

In practice, the determination, given two satellites, of the reciprocal attitude and of the reciprocal position requires the determination of six degrees of freedom. In fact, assuming a first and a second reference system that are integral, respectively, to a first and a second satellite and formed, each, by a triplet of perpendicular axes, the reciprocal attitude and the reciprocal position between the first and the second reference system, and therefore between the first and the second satellite, can be expressed in terms of three (linear) displacements and three rotations (angles). In particular, the reciprocal position of the first satellite with respect to the second satellite can be expressed by means of a triplet of three displacements measured, respectively, along the three axes of the second reference system; similarly, the reciprocal attitude of the first satellite with respect to the second satellite can be expressed by means of a triplet of three angles, equal to corresponding rotations of the first reference system with respect to the second reference system.

Having said that, in general, the optical metrological systems available today can be subdivided into so-called coarse systems and into so-called fine systems, depending on the accuracy and the field of application, the latter being given by the range of distances that can exist between the satellites without significant degradation in performance.

More specifically, the precision metrological systems allow the reciprocal position of two satellites to be determined with an accuracy lower than a centimetre, provided that the satellites are no more than fifty metres apart. Some precision metrological systems can even determine the reciprocal position of two satellites with an accuracy of the order of a tenth of a millimetre, provided that the satellites are no more than one metre apart.

In contrast, the coarse metrological systems are characterised by an accuracy not lower than ten centimetres, but they can also operate when the distance between the satellites is greater than fifty metres, for example even up to distances of twenty kilometres.

For example, document US 2007/0031151 A1 discloses a technique for acquiring and tracking laser communication terminals in an open-space laser communication system.

For example, radio-frequency communication systems between aircrafts, as well as radio-frequency communication systems between aerospace vehicles and ground stations are known; the latter enable data on the status of the aerospace vehicle itself, such as speed, position, temperature, payload, to be communicated to ground stations via electronic devices operating on radio frequencies. However, such radio-frequency communication systems cannot be used as an aid to existing metrological systems to determine the above-mentioned quantities relative to the position and/or attitude of two aerospace vehicles, nor to carry out specific tasks performed by the two satellites. In addition, such radio-frequency communication systems have a low data transmission rate, e.g. lower than 10 bytes/s, a high energy cost and a limited number of functionalities.

For example, the article "Fusion of radar sensing and wireless communications by embedding communication signals into the radar transmit waveform" by Geng Zhe et al., published in IET Radar Sonar Navig., 2018, volume 12, number 6, pages 632-640, discloses a radar-type, radio-frequency communication system in which a communication signal is embedded into a radar position signal.

OBJECT AND SUMMARY OF THE INVENTION

Aim of the present invention is therefore to provide an optical unit for a projective metrological system which solves at least in part the drawbacks of the known art.

According to the present invention, an optical unit for a projective metrological system and a projective optical metrological system including the optical unit, as defined in the appended claims, are provided.

BRIEF DESCRIPTION OF THE DRAWINGS

For a better understanding of the invention, some embodiments thereof will now be disclosed, for merely illustrative and non-limiting purposes and with reference to the enclosed drawings, wherein.

DETAILED DESCRIPTION OF PREFERRED EMBODIMENTS OF THE INVENTION

The present invention will now be described in detail with reference to the accompanying figures to allow a skilled person to make and use it. Various modifications of the embodiment described will be immediately clear to the skilled person and the general principles disclosed can be applied to other embodiments and applications without departing from the protection scope of the present invention, as defined in the enclosed drawings. Therefore, the present invention shall not be limited to the illustrated and described embodiments, but it must be granted the widest protection scope in accordance with the features disclosed and claimed.

Unless otherwise defined, all the herein used technical and scientific terms have the same meaning commonly used by the ordinary skilled in the art of the present invention. In case of conflict, the present invention, including definitions provided, will be binding. Furthermore, the examples are provided for merely illustrative purposes and must not be regarded as limiting.

Figure 1:
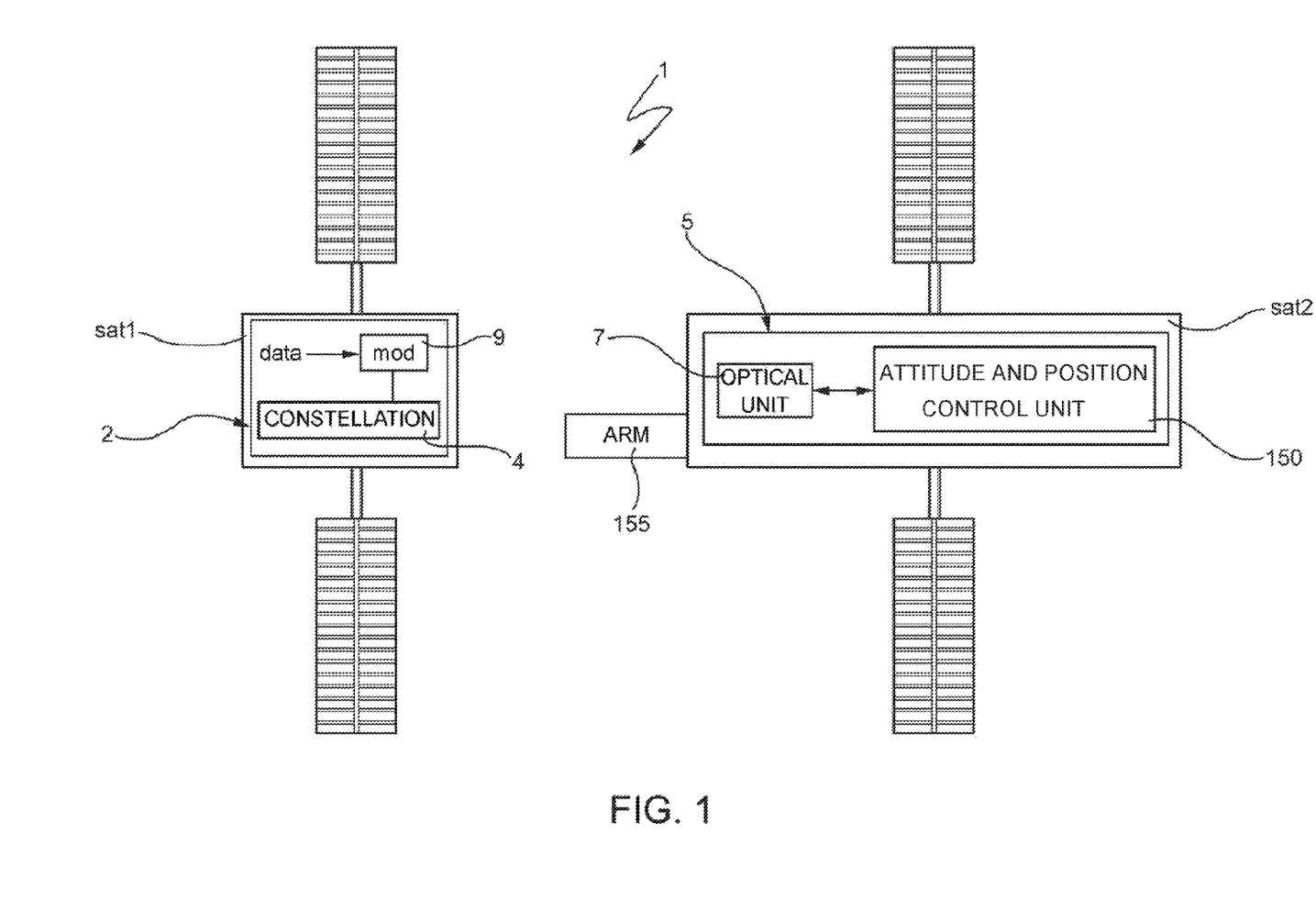
FIG. 1 shows a block diagram of a satellite system including a projective optical metrological system and the present optical unit.

FIG. 1 shows a projective optical metrological system, which is referred to in the following as metrological system 1 for the sake of brevity.

In the following a metrological system 1 with particular reference to a satellite type application is described, although it can be used in different application areas, as mentioned later.

In detail, the metrological system 1 comprises a transmission unit 2, which comprises a constellation 4 and is adapted to be bound to a first satellite sat1; furthermore, the metrological system 1 comprises a reception unit 5, which comprises an optical unit 7 and is adapted to be bound to a second satellite sat2.

Figures 2, 3:
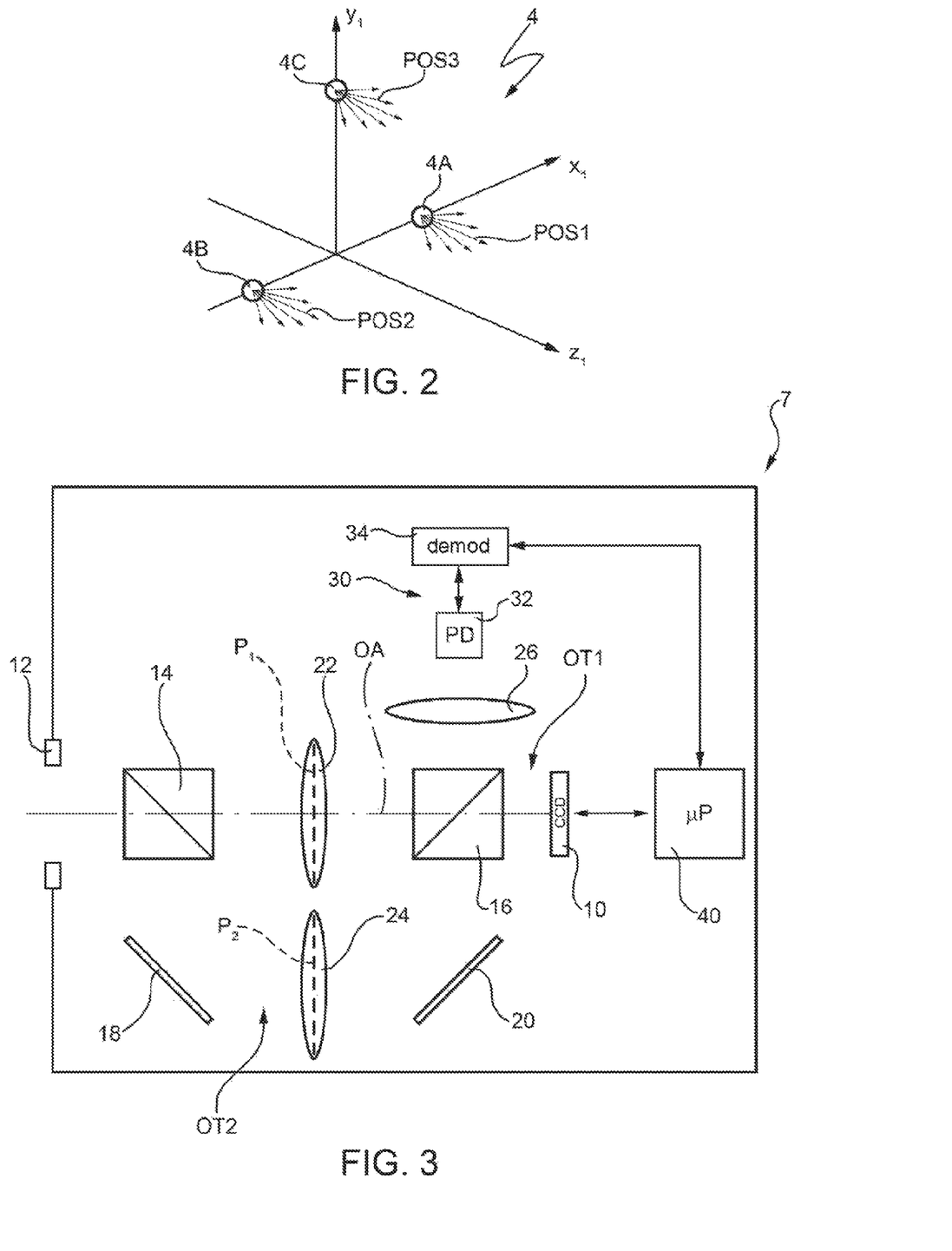
FIG. 2 shows schematically a perspective view of optical sources of a light constellation.
FIG. 3 shows a block diagram of the present optical unit.

As shown in more detail in FIG. 2, the constellation 4 comprises a first, a second and a third light source 4A-4C, each formed by, for example, a corresponding Light Emitting Diode (LED) and each configured to emit a respective primary optical signal. The combination of the primary optical signals of the first, of the second and of the third light sources 4A-4C forms a light signal LS. For simplicity's sake, the primary optical signals emitted by the first, by the second and by the third light sources 4A-4C respectively are shown (qualitatively) only in FIG. 2, where they are indicated with POS1, POS2, POS3, respectively. By way of example only, the primary optical signals POS1, POS2, POS3 emitted by the first, by the second and by the third light sources 4A-4C may have wavelengths ranging between 400-700 nm. In general, however, the primary optical signals POS1, POS2, POS3, and thus also the light signal LS, can have wavelengths also outside the visible.

The first, the second and the third light sources 4A-4C are arranged coplanar and at the vertices of a hypothetical triangle, e.g. isosceles or equilateral. In particular, in the hypothesis of punctiform light sources, assuming a first reference system $x_1, y_1, z_1$ integral with the first satellite sat1 and formed by three axes $x_1, y_1, z_1$ orthogonal to each other, and assuming moreover that the axis $z_1$ is perpendicular to the plane in which the first, the second and the third light sources 4A-4C, lie and that the first and the second light sources 4A-4B lie along the axis $x_1$, it is possible to express the points of the space in which the first, the second and the third light sources 4A-4C lie as $[X_0,0,0]$, $[-X_0,0,0]$ and $[0,Y_0,0]$, respectively.

The transmission unit 2 further comprises a modulation device 9, coupled to each of the first, the second and the third light sources 4A-4C.

The modulation device 9 is configured to receive transmission (e.g., binary) data, which arrives at the modulation device 9 as electrical signals and are provided by electronic devices installed on the first satellite sat1, such as temperature sensors, position sensors, inertial measurement units (IMUs) such as accelerometers and gyroscopes, payload sensors, etc. In addition, the modulation device 9 is configured to modulate the primary optical signal of each of the first, the second and the third light sources 4A-4C as a function of the transmission data.

In this embodiment, the modulation device 9 performs an on-off keying ("OOK") binary intensity modulation, e.g. according to a return-to-zero ("RZ") or non-return-to-zero ("NRZ") pattern, of the primary optical signals POS1, POS2, POS3 emitted by the first, by the second and by the third light sources 4A-4C; in this way, the aforementioned transmission data are transmitted, with a bit rate, for example, ranging between 1 kbit/s and 1 Mbit/s. In other words, the modulation device 9 switches on/off the first, the second and the third light sources 4A-4C all together, as a function of transmission data.

In more detail, each between the first, the second and the third light sources 4A-4C undergoes the same intensity modulation, so that the primary optical signals POS1. POS2, POS3 emitted by the first, by the second and by the third light sources 4A-4C are equal to each other.

In other words, the light signal LS generated by the constellation 4 is modulated in intensity as a function of the transmission data, and thus as a function of the aforementioned electrical signals arriving at the modulation device 9.

As shown in FIG. 3, the optical unit 7 comprises an optoelectronic sensor 10, a diaphragm 12 adapted to receive the light signal LS generated by the constellation 4, a first and a second optical beam splitter 14, 16, a first and a second reflecting element 18, 20, a first, a second and a third intermediate lens 22, 24, 26 and an optical receiver 30 comprising a photodetector 32 and a demodulation device 34. By way of example only, the first, the second and the third intermediate lenses 22, 24, 26 may be concave.

The optical unit 7 further comprises an electronic processing unit 40, which is electrically connected to the optoelectronic sensor 10 and to the optical receiver 30.

In more detail, the diaphragm 12, the first optical beam splitter 14, the first intermediate lens 22, the second optical beam splitter 16 and the optoelectronic sensor 10 are arranged in succession and optically aligned. In other words, the first optical beam splitter 14 is interposed between the diaphragm 12 and the first intermediate lens 22, which in turn is interposed between the first and the second optical beam splitter 14, 16; finally, the second optical beam splitter 16 is interposed between the first intermediate lens 22 and the optoelectronic sensor 10.

In more detail, the optical axes of the diaphragm 12 and of the first intermediate lens 22 are approximately coincident and substantially impact the centre of the optoelectronic sensor 10. By way of example, in FIG. 3 the (coincident) optical axes of the input lens 12 and of the first intermediate lens 22 are indicated with OA; for simplicity's sake, they are referred to in the following as the system axis OA.

In practice, the diaphragm 12, the first optical beam splitter 14, the first intermediate lens 22 and the second optical beam splitter 16 form a first optical circuit OT1.

As regards, instead, the second intermediate lens 24, it is interposed between the first and the second reflecting elements 18, 20, so that the diaphragm 12, the first optical beam splitter 14, the first reflecting element 18, the second intermediate lens 24, the second reflecting element 20 and the second optical beam splitter 16 form a second optical circuit OT2.

The third intermediate lens 26 is interposed between the second optical beam splitter 16 and the photodetector 32. For example, the photodetector 32 may be placed at a distance from the third intermediate lens 26 approximately equal to the focal length of the third intermediate lens 26.

Figure 4:
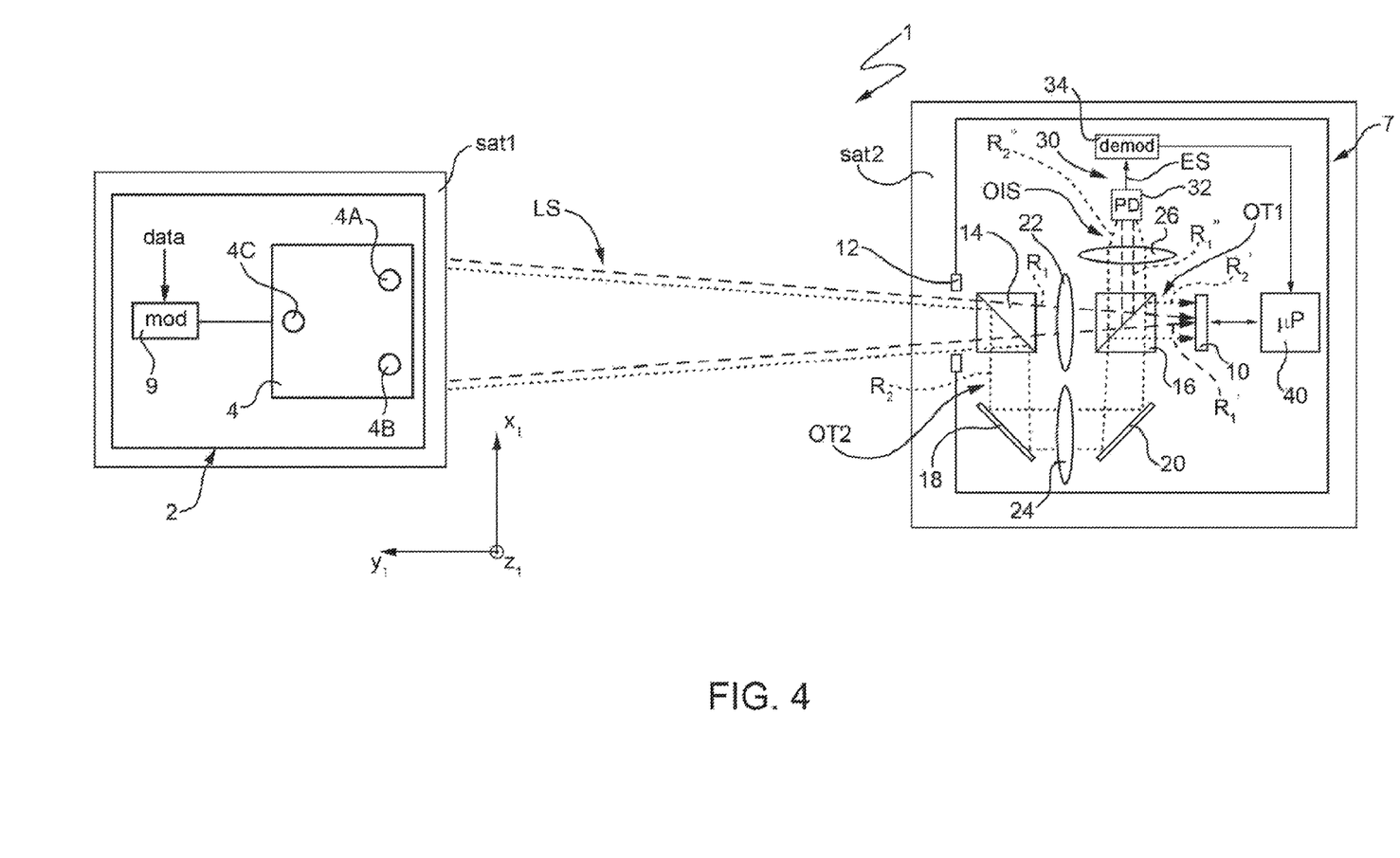
FIG. 4 shows a block diagram of the satellite system of FIG. 1 in use.

Operationally, the first optical beam splitter 14 separates the light signal LS into a first and into a second optical beam $R_1$, $R_2$ shown purely qualitatively in FIG. 4.

The first optical beam $R_1$ traverses the first optical beam splitter 14 and the first intermediate lens 22. The second optical beam splitter 16 separates the first optical beam $R_1$ into a first and a second part $R_1'$, $R_1''$.

The first part $R_1''$ is transmitted by the second optical beam splitter 16 in the direction of the optoelectronic sensor 10. In other words, the first optical circuit OT1 directs a fraction of the first optical beam $R_1$ on the optoelectronic sensor 10, along the system axis OA.

The second part $R_1''$ is reflected by the second optical beam splitter 16, in the direction of the third intermediate lens 26, which focuses the second part $R_1''$ on the photodetector 32.

The first optical circuit OT1 thus defines a first optical path, interposed between the diaphragm 12 and the optoelectronic sensor 10 and having a first length $l_1$, understood as the sum of the distance that the first optical beam $R_1$ travels to reach, starting from the diaphragm 12, the second optical beam splitter 16 and of the distance that the first part $R_1'$ of the first optical beam $R_1$ travels to reach, from the second optical beam splitter 16, the optoelectronic sensor 10.

The second optical beam $R_2$ is directed by the first beam splitter 14 on the first reflecting element 18.

The first reflecting element 18, the second intermediate lens 24 and the second reflecting element 20 are also arranged so that the second optical beam $R_2$ is reflected by the first reflecting element 18 in the direction of the second intermediate lens 24. After traversing the second intermediate lens 24, the second optical beam $R_2$ is received by the second reflecting element 20, which reflects it in the direction of the second optical beam splitter 16. The second optical beam splitter 16 reflects a respective first part $R_2'$ of the second optical beam $R_2$ in the direction of the optoelectronic sensor 10, still along the system axis OA, and transmits a second part $R_2''$ of the second optical beam $R_2$ in the direction of the third intermediate lens 26, which focuses the second part $R_2''$ of the second optical beam $R_2$ on the photodetector 32.

The second optical circuit OT2 thus defines a second optical path, interposed between the diaphragm 12 and the optoelectronic sensor 10 and having a second length $l_2$, greater than the first length $l_1$ and understood as the sum of the distance that the optical rays of the second optical beam $R_2$ travel to reach, starting from the diaphragm 12, the second optical beam splitter 16 and of the distance that the first part $R_2'$ of the second optical beam $R_2$ travels to reach, from the second optical beam splitter 16, the optoelectronic sensor 10.

The second optical path does not traverse the first intermediate lens 22 and also shares with the first optical path the same input point, defined by the diaphragm 12, and the same end point, defined by the optoelectronic sensor 10.

In addition, the second optical beam splitter 16 operates so as to spatially recombine parts of the first and of the second optical beams $R_1$, $R_2$ (in particular, the respective second parts $R_1''$, $R_2''$), which form an optical signal which is referred to in the following as the optical information signal OIS. The optical information signal OIS affects the photodetector 32, as will be described in more detail below.

In more detail, as in the case of the projective metrological system described in European patent EP2508428 on behalf of the Applicant, each lens of the first and the second intermediate lenses 22, 24 has a respective pair of main planes, also known as the front main plane and the rear main plane, which, in the case where the lens is thin, collapse into a single main plane. Therefore, assuming that the first and the second intermediate lenses 22, 24 are effectively thin, they have, respectively, a first and a second main plane $P_1$, $P_2$, which pass through the optical centres of the first and of the second intermediate lenses 22, 24, respectively. Furthermore, the first and the second intermediate lenses 22, 24 have, respectively, a first and second focal length $f_1$, $f_2$, the second focal length $f_2$ being greater than the first focal length $f_1$.

Even more in detail, assuming for simplicity's sake that the first optical beam splitter 14 has negligible dimensions, the first and the second main planes $P_1$, $P_2$, and therefore also the first and the second intermediate lenses 22, 24, are distant from the first optical beam splitter 14, respectively, by a first distance $d_1$ and a second distance $d_2$, measured along the first and the second optical paths, respectively. In other words, neglecting the inclination of the optical beams with respect to the system axis OA, the first optical beam $R_1$ travels, to reach the first main plane $P_1$ starting from the first optical beam splitter 14, along a distance equal to $d_1$; likewise, the second optical beam $R_2$ travels, to reach the second main plane $R_2$ starting from the first optical beam splitter 14, along a distance equal to $d_2$.

In practice, from an optical point of view, the first and the second main planes $P_1$, $P_2$ are distant from the constellation 4, respectively, by a distance $d_{p1}=D_{sat}+d_1$ and $d_{p2}=D_{sat}+d_2$, wherein $D_{sat}$ is the distance between the constellation 4 and the first optical beam splitter 14. Therefore, from an optical point of view, the first and the second main planes $P_1$, $P_2$ are differently distant from the constellation 4. Equivalently, the first and the second main planes $P_1$, $P_2$ are differently distant from the diaphragm 12, since they are differently spaced from the first optical beam splitter 14, and the first and the second optical paths, between the diaphragm 12 and the first optical beam splitter 14, are coincident. In particular, by indicating with de the distance between the diaphragm 12 and the first optical beam splitter 14, the first and the second main planes $P_1$, $P_2$ are distant from the diaphragm 12, respectively, by $d_C+d_1$ and $d_C+d_2$. It should be noted that $d_1$ and $d_2$ may also take on negative values if the first and/or the second main planes $P_1$, $P_2$ lie between the diaphragm 12 and the first optical beam splitter 14.

Furthermore, the first and the second main planes $P_1$, $P_2$, and thus the first and the second intermediate lenses 22, 24, are distant from the optoelectronic sensor 10, respectively, by a third and a fourth distance $d_3$, $d_4$, measured along the first and the second optical paths, respectively. In other words, neglecting the inclination of the optical beams with respect to the system axis OA, the first optical beam $R_1$ travels, to reach the optoelectronic sensor 10 starting from the first main plane $P_1$, along a distance equal to $d_3$; likewise, the second optical beam $R_2$ travels, to reach the optoelectronic sensor 10 starting from the second main plane $P_2$, along a distance equal to $d_4$.

Figure 5:
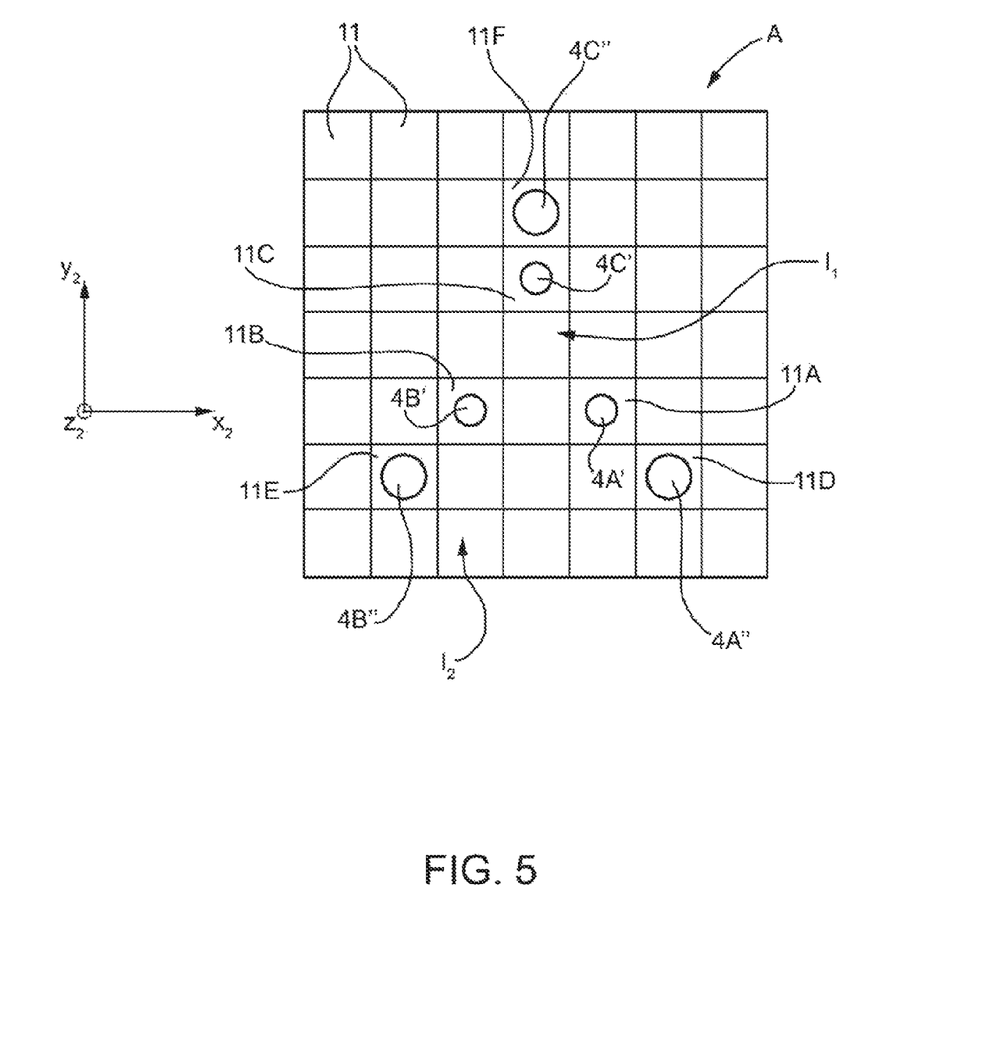
FIG. 5 qualitatively shows a front view of a detection surface of an optoelectronic sensor of the optical unit shown in FIG. 3.

In greater detail, as shown in FIG. 5, the optoelectronic sensor 10 may be formed, for example, by a coupling charge device (CCD) and has a detection surface A for example of a square shape; the aforementioned third and fourth distances $d_3$ and $d_4$ express precisely the distances of the first and of the second main planes $P_1$, $P_2$ from the detection surface A.

The detection surface A is formed by a matrix of M image elements generally known as pixels 11 and is arranged, as previously mentioned, perpendicularly with respect to the system axis OA. i.e. perpendicularly to the optical axes of the diaphragm 12 and of the first intermediate lens 22; moreover, the geometric centre of the detection surface A preferably lies along the system axis OA. In practice, the optoelectronic sensor 10 is a so-called image sensor.

Again with reference to the third and to the fourth distances $d_3$, $d_4$, they can be equal to the first and to the second focal lengths $f_1$ and $f_2$, respectively.

In use, as described in EP2508428, the first parts $R_1'$, $R_2'$ of the first and of the second optical beams $R_1$, $R_2$ form on the detection surface A of the optoelectronic sensor 10 a first and, respectively, a second image of the constellation 4, such images having different magnifications, which depend, inter alia, in a manner per se known, on the first and the second focal lengths $f_1$ and $f_2$.

In particular, as shown in FIG. 5, the first part $R_1'$ of the first optical beam $R_1$ forms on the detection surface A of the optoelectronic sensor 10 a first image $I_1$ of the constellation 2, formed by a first, a second and a third image point 4A'-4C', corresponding respectively to the first, to the second and to the third light sources 4A-4C. Furthermore, the first part $R_2'$ of the second optical beam $R_2$ forms on the detection surface A of the optoelectronic sensor 10 a second image $I_2$ of the constellation 4, formed by a fourth, a fifth and a sixth image point 4A"-4C", corresponding respectively to the first, to the second and to the third light sources 4A-4C. It should be noted that, for simplicity's sake of visualisation, in FIG. 5 it has been assumed that each image point excites only one pixel, although typically each image point excites more than one pixel.

From another point of view, the first parts $R_1'$, $R_2'$ of the first and of the second optical beam $R_1$, $R_2$ cause the formation, on the detection surface A of the optoelectronic sensor 10, of a distribution of M light intensities, as detected by the pixels 11. On the basis of the distribution of M light intensities, the electronic processing unit 40 is able to determine a first, second and a third pixel, respectively indicated by 11A-11C, which correspond, respectively, to the first, to the second and to the third image points 4A'-4C'. Furthermore, the electronic processing unit 40 is able to determine a fourth, a fifth and a sixth pixel, respectively indicated by 11D-11F, which correspond, respectively, to the fourth, the fifth and the sixth image points 4A"-4C".

Subsequently, as described in EP2508428, the electronic processing unit 40 is able to determine the six quantities relative to attitude and position, based on the positions of the aforementioned first, second, third, fourth, fifth and sixth pixels. In the event that, for any reason (e.g., excessive distance between the satellites), the electronic processing unit 40 is only able to identify a subset of pixels between the aforementioned first, second, third, fourth, fifth and sixth pixels, the number of quantities that can be determined by the electronic processing unit 40 is reduced accordingly.

In practice, the metrological system 1, of a bifocal type, allows to analytically and unambiguously determine all the six degrees of freedom that characterize the position and the attitude of the constellation 4 with respect to the optical unit 7, as described in detail in the European patent EP2508428, thanks to the possibility of having two different images of the constellation 4, obtained by means of two optical systems (in this case, the first and the second optical circuits OT1 and OT2) that share the same input point of the optical rays, have main planes that are at different distances from the constellation and have different focal lengths. In this way, two different images of the constellation 4 are formed on the detection surface A.

Furthermore, as previously mentioned, the second part $R_1"$ of the first optical beam $R_1$ and the second part $R_2"$ of the second optical beam $R_2$ form the optical information signal OIS, which is directed by the second beam splitter 16 on the third intermediate lens 26 and is focused by the latter on an active area, not shown herein, of the photodetector 32.

The photodetector 32, for example formed by a PIN type or avalanche photodiode, is configured to generate an electrical signal ES (e.g., a current) proportional to the intensity of the optical information signal OIS.

Consequently, the electrical signal ES is also modulated as a function of the transmission data. The electrical signal ES is then appropriately demodulated by the demodulation device 34, which in a per se known may comprise for example an amplifier, a filter and a modulation frequency extraction device, not shown herein. The signal thus demodulated is provided to the electronic processing unit 40, which is configured to process the transmission data sent by the transmission unit 2.

Furthermore, as shown in FIG. 1, the reception unit 5 may comprise an attitude and position control system 150, electrically coupled to the electronic processing unit 40. The attitude and position control system 150 receives the quantities indicative of attitude and position which, over time, are determined by the electronic processing unit 40, iterating the operations described above. The attitude and position control system 150 can therefore operate, in a per se known manner, based on the quantities provided by the electronic processing unit 40.

Furthermore, in this embodiment, the second satellite sat2 comprises a mechanical arm 155 that is controlled by the attitude and position control system 150 and is therefore capable of performing operations based on the reciprocal position and attitude of the first and of the second satellite sat1, sat2 and/or based on the information obtained from the transmission data sent by the transmission unit 2 hosted by the first satellite sat1. The mechanical arm 155 can for example be used during so-called docking operations, and more generally during operations aimed at establishing a mechanical coupling between the first and the second satellite sat1, sat2.

The optical unit 7 therefore allows obtaining a projective optical metrological system capable not only of determining the reciprocal position and attitude of the first and of the second satellites, but also of transmitting information from the first to the second satellite, using a single transmission unit and a single reception unit, thus limiting the increase in complexity of the metrological system. Furthermore, the fact that the optical information signal OIS is taken starting from the second optical beam splitter 16 ensures that this operation does not affect the formation of the images on the detection surface A. In addition, the optical information signal OIS is formed starting from portions (the second parts $R_1"$, $R_2"$ of the first and of the second optical beam splitters $R_1$, $R_2$) that would otherwise be wasted (e.g., they should affect an absorber, so as not to give rise to unwanted reflections).

Figure 6:
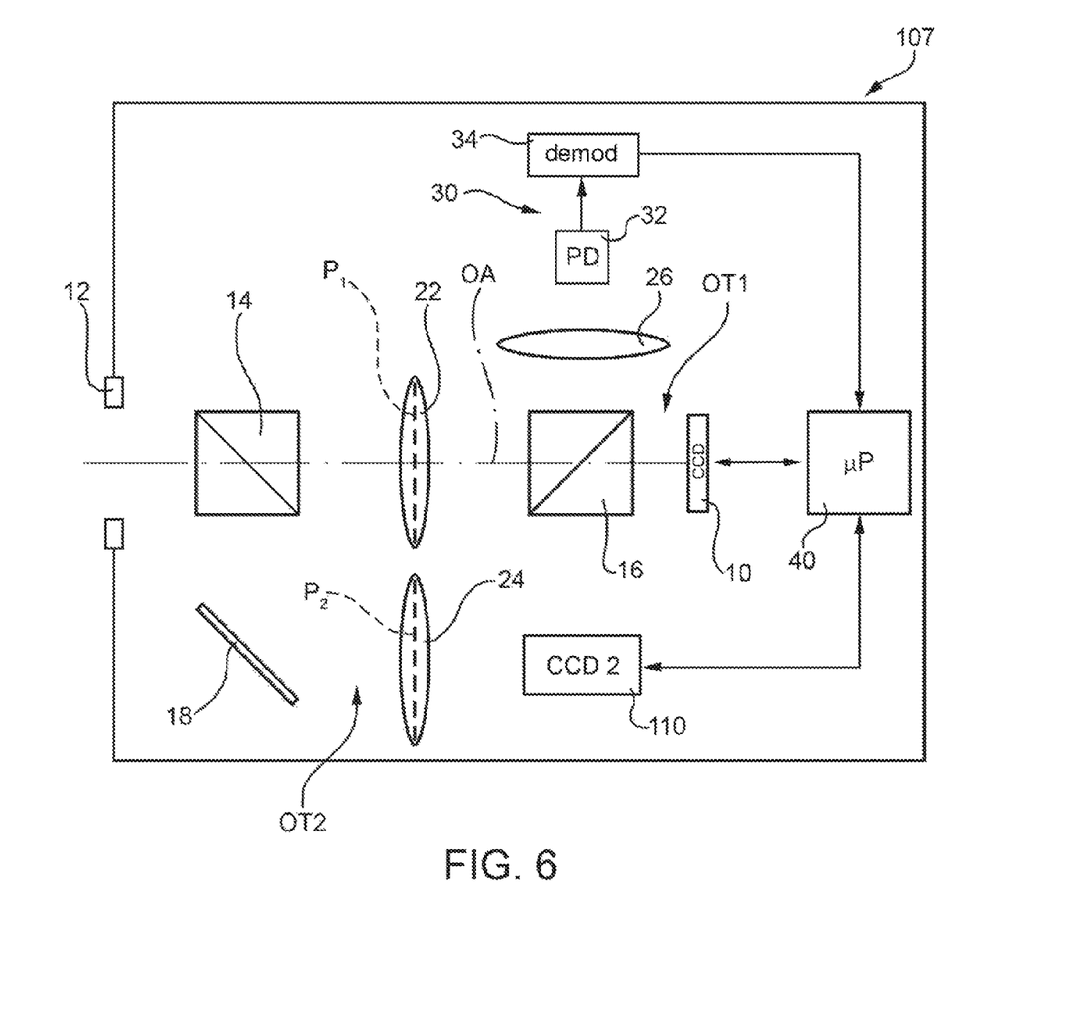
FIG. 6 shows a block diagram of a further embodiment of the present optical unit.

FIG. 6 shows the present optical unit according to a different embodiment, referred to herein as optical unit 107, wherein elements in common with optical unit 7 are provided with the same reference numbers.

The optical unit 107 comprises a second optoelectronic sensor 110, for example of the same type as the first optoelectronic sensor 10, which is placed at a distance approximately equal to the focal distance $f_2$ from the second intermediate lens 24 and is electrically connected to the electronic processing unit 40. Furthermore, the second optical circuit OT2 does not comprise the second reflecting element 20.

In other words, in this embodiment, the second optical beam $R_2$ travels from the first optical splitter 14 on the first reflecting element 18 and is focused by the second intermediate lens 24 directly on the second optoelectronic sensor 110. Thus, the first image I1 is formed on the first optoelectronic sensor 10, while the second image I2 is formed on the second optoelectronic sensor 110. Furthermore, only the second part $R_1''$ of the first optical beam $R_1$ is focused on the photodetector 32 and contributes to generate the electrical signal ES, and thus to receive the transmission data.

The fact that the photodetector 32 receives an optical signal originating from only one optical path, here the first optical path of the first optical circuit OT1, allows, in principle, a correct demodulation of the optical information signal OIS even in the presence of higher bit rates, with the same incident power on the photodetector 32.

Alternatively, the optical information signal OIS may be taken from the first and/or from the second optical beams $R_1$, $R_2$ at a different point of the first and/or of the second optical circuits OT1, OT2. For example, according to a further embodiment not shown, a third optical beam splitter may be interposed between the diaphragm 12 and the first optical signal splitter 14, so that it reflects a portion of the light signal LS towards the optical receiver 30 and let another portion of the light signal LS, traverse it, directed to the first optical signal splitter 14, where it will undergo the same optical treatment as described with reference to FIG. 3.

Finally, it is clear that modifications and variations can be made to the described metrological system without departing from the scope of the present invention.

For example, the first, the second and the third intermediate lenses 22, 24, 26 may each be replaced by a respective optical group, each formed by several lenses, as described in European Patent EP2508428, with reference to FIG. 7.

Furthermore, different embodiments are possible, wherein the constellation has a number $N_s$ of light sources, with $N_s$ different from three, and wherein the optical unit 7 has further optical circuits, such that it is capable of forming, on one or more detection surfaces A, a number $N_I$ of images, where $N_I$ is the total number of optical circuits present in the optical unit 7. For example, it may be that it is $N_s=2$ and $N_I=3$. In fact, by increasing the number of images, it is possible to reduce the number of light sources in the constellation, without renouncing to determine any of the aforementioned quantities. It is also possible that the electronic processing unit 40 determines different quantities with respect to the angles $\theta$, $\beta$, $\gamma$, to the distance D and to the displacements $\Delta x$, $\Delta y$ described in the European patent EP2508428, like for example quantities referred to non-Cartesian reference systems, which is a subset of such quantities.

An input lens may be present in place of the diaphragm 12. In addition, the first, the second and the third intermediate lenses 22, 24, 26 may be of a type different from what has been described.

The first and the second optical beam splitters 14, 16 may be formed by corresponding prisms or may be of any other known type, or may be replaced by functionally equivalent optical devices.

Again, the light sources of the constellation may be arranged at the vertices of a scalene triangle and/or may be different with respect to what has been described.

Regarding the modulation device, it may formed by a single modulator shared between all light sources, and it therefore may receive at input a single electrical signal modulated with the data to be transmitted, or it may comprise a modulator for each light source.

Finally, although not shown, there are possible embodiments in which the light sources of the light constellation, instead of being of the active type (i.e. emitting photons), are of the passive type, in which case (not shown) they are formed by corresponding reflectors. These reflectors are adapted to receive an unmodulated optical excitation signal, generated for example by the optical unit described above and modified for this purpose, and to reflect it with reflectivities modulated as a function of the transmission data; consequently, the optical signals reflected by the reflectors are functionally equivalent to the aforementioned primary optical signals POS1, POS2, POS3.

Finally, the metrological system may, as mentioned above, be used in different areas, such as flight control of drone systems or the control of ships or robotic systems.

The invention claimed is:

1. An optical unit for a projective optical metrological system (1), configured to receive a light signal (LS) coming from a light constellation (4) comprising a number of light sources (4A-4C), said optical unit (7; 107) comprising:
    an optoelectronic image acquisition system (10; 110);
    a first and a second optical circuit (OT1, OT2) configured to receive the light signal (LS) and to be traversed by a first and a second optical beam ($R_1$,$R_2$), respectively, the first and the second optical circuits (OT1, OT2) being further configured to direct, respectively, at least a first part ($R_1'$) of the first optical beam ($R_1$) and at least a first part ($R_2'$) of the second optical beam ($R_2$) on said optoelectronic image acquisition system (10; 110), so as to cause the simultaneous formation of two different images ($I_1$, $I_2$) of the constellation (4) in the optoelectronic image acquisition system (10; 110);
    an electronic processing unit (40) coupled to the optoelectronic image acquisition system (10; 110) and configured to determine a number of quantities indicative of the position and/or attitude of the light constellation (4) with respect to the optical unit (7), based on said two images;
    an optical receiver (30); and
    a derivation optical circuit (16, 26) configured to optically couple the optical receiver (30) and at least one of the first and the second optical circuits (OT1, OT2), so that the optical receiver (30) receives an optical information signal (OIS), which is a function of at least one of the first and the second optical beams ($R_1$, $R_2$);
    and wherein the optical receiver (30) is configured to demodulate digital data from the optical information signal (OIS).

2. The optical unit according to claim 1, wherein the optical receiver (30) comprises:

a photodetector (32), optically coupled to said derivation optical circuit (16, 26) and configured to generate an electrical signal (ES) as a function of the optical information signal (OIS); and a demodulation device (34), electrically coupled to the photodetector (32) and configured to extract said digital data from said electrical signal (ES).

3. The optical unit according to claim 1, wherein the derivation optical circuit (16, 26) comprises an optical device (26) configured to focus the optical information signal (OIS) on the photodetector (32).

4. The optical unit according to claim 1, wherein said demodulation device (34) is configured to perform a demodulation of the on-off keying type.

5. The optical unit according to claim 1, wherein said derivation optical circuit (16, 26) comprises an additional optical beam divider (16), which is configured to receive at least the first optical beam ($R_1$) and to divide the first optical beam ($R_1$) into said respective first part ($R_1'$), directed towards the optoelectronic image acquisition system (10; 110), and into a respective second part ($R_1''$), directed towards the optical receiver (30).

6. The optical unit according to claim 5, wherein said additional optical beam splitter (16) is configured so as to receive also the second optical beam ($R_2$) and to divide the second optical beam ($R_2$) into said respective first part ($R_2'$), directed towards the optoelectronic image acquisition system (10), and into a respective second part ($R_2''$), directed towards the optical receiver (30).

7. The optical unit according to claim 6, wherein the optoelectronic image acquisition system (10) comprises a sensitive surface (A); and wherein the first and the second optical circuits (OT1, OT2) terminate on said sensitive surface (A), so that the two different images ($I_1$, $I_2$) of the constellation (4) are formed on the sensitive surface (A).

8. The optical unit according to claim 1, wherein the first and the second optical circuits (OT1, OT2) share the same optical input (12), configured to receive the light signal (LS) coming from the light constellation (4).

9. The optical unit according to claim 8, further comprising an input optical beam splitter (14), arranged downstream of the receiving optical element (12) and configured to divide the light signal (LS) into the first and the second optical beams ($R_1$, $R_2$).

10. The optical unit according to claim 1, wherein the electronic processing unit (40) is configured to determine, for each of said two different images, a number of light intensity maxima equal to the number of light sources (4A-4C) of the light constellation (4), and to determine, on the basis of the determined positions of the light intensity maxima, said quantities indicative of the position and/or attitude of the light constellation (4) with respect to the optical unit (7).

11. A projective optical metrological system (1) comprising:
- the optical unit (7; 107) according to claim 1;
- a transmission unit (2), which comprises the light constellation (4);
- and wherein each light source (4A-4C) of the light constellation (4) is configured to generate a corresponding primary optical signal (POS1, POS2, POS3); and wherein the transmission unit (2) further comprises a modulation device (9) configured to modulate the primary optical signals (POS1, POS2, POS3) as a function of said digital data, so that the primary optical signals (POS1, POS2, POS3) are equal to each other.

12. The metrological system according to claim 11, wherein the modulation device (9) is configured to implement an on-off keying modulation.

13. The metrological system according to claim 11, wherein the light constellation (4) comprises a first, a second and a third light source (4A-4C), so that each image of said two different images is formed from a first, a second and a third image point (4A', 4B', 4C'; 4A'', 4B'', 4C'').

14. A satellite system comprising a first and a second satellite (sat1, sat2) and a metrological system (1) according to claim 11, wherein the transmission unit (2) and the optical unit (7; 107) are bound to the first and the second satellites (sat1, sat2), respectively; and further comprising an attitude and/or position control system (150) bound to the second satellite (sat2) and configured to receive the quantities indicative of the position and/or attitude determined by the electronic processing unit (40) and/or said digital data.

* * * * *